April 16, 1957 M. FRISCH 2,788,781
ENGINE STARTING-AID SYSTEM
Filed March 23, 1954 3 Sheets-Sheet 1

INVENTOR

BY

ATTORNEY

April 16, 1957 M. FRISCH 2,788,781
ENGINE STARTING-AID SYSTEM
Filed March 23, 1954 3 Sheets-Sheet 2
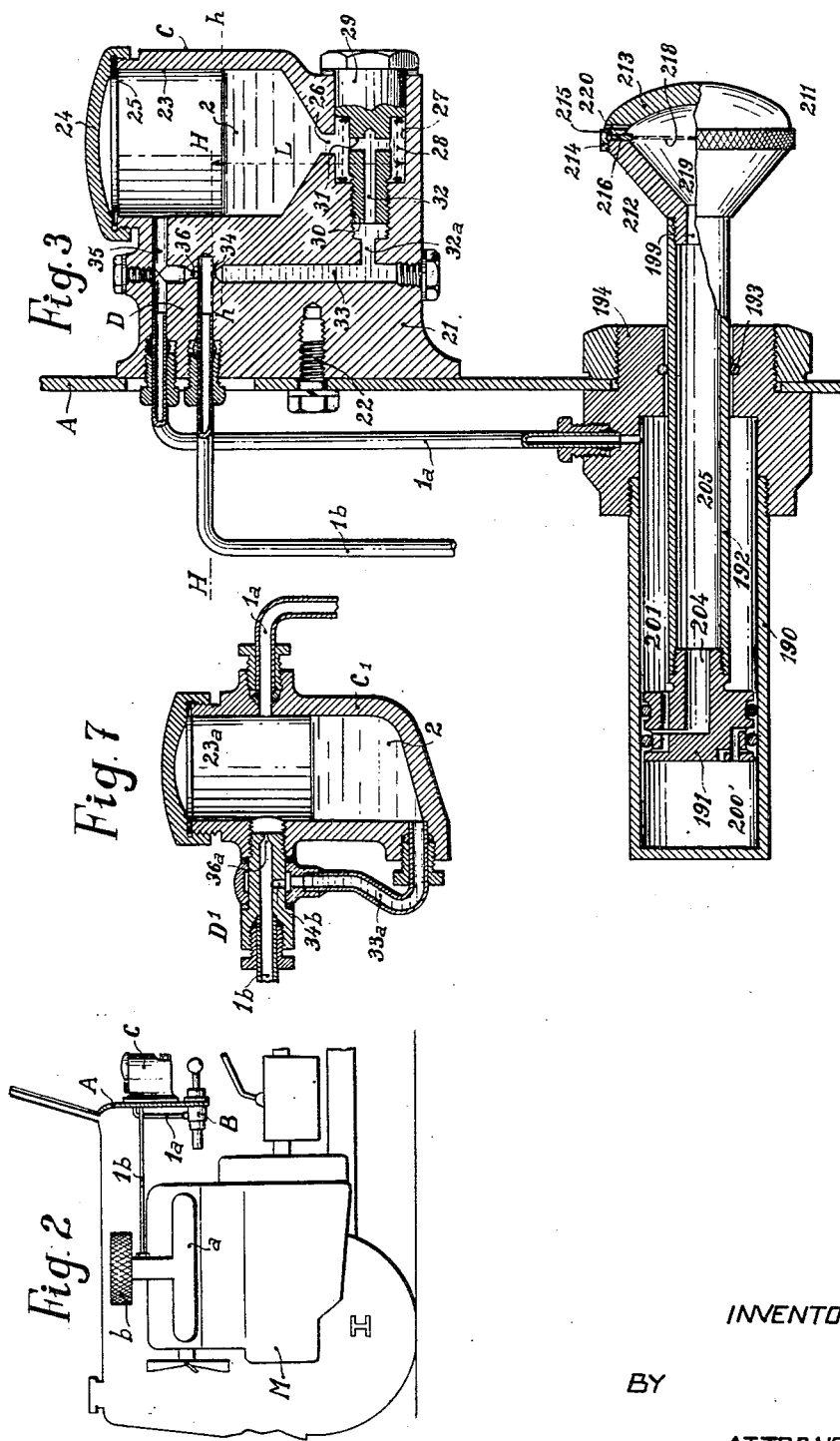
INVENTOR
BY
ATTORNEY United States Patent Office 2,788,781
Patented Apr. 16, 1957

2,788,781
ENGINE STARTING-AID SYSTEM

Maurice Frisch, Champigny-sur-Marne, France, assignor to Procombur-Société pour le Traitement des Combustibles, Paris, France, a corporation of France Application March 23, 1954, Serial No. 418,197

Claims priority, application France March 25, 1953

18 Claims. (Cl. 123—187.5)

The present invention relates to the starting of internal combustion engines both of the explosion type and of the diesel or similar types, powered by liquid or pulverized solid fuels.

Such engines are frequently difficult to start especially in cold weather and it has been suggested to facilitate starting by a temporary admission into the cylinders or into the induction manifold of a small quantity of a substance such as diethyl ether, a volatile ester, a nitric or peroxide compound, or the like, which will facilitate the ignition of the explosive mixture especially at low temperature.

For the admission of such a liquid in a finely divided state it is known to utilize a pump preliminarily charged with the liquid and connected with an intake provided therefor on the engine or the intake manifold. However such a procedure has one serious drawback. The solvent or oxidizing properties of the starting aid substance used are apt to damage the metal surfaces and the necessary sealing means due to corrosion, swelling, and partial or complete dissolution of the materials with which said substance comes into contact.

It is an object of this invention to provide an improved method of facilitating the starting of combustion engines by spraying a start-promoting liquid into the intake manifold of the engine for overcoming the above mentioned difficulties.

The method of the invention essentially comprises creating outside of the engine a circulation of compressed air over a predetermined circuit, subjecting to pressure within an enclosure a metered amount of an auxiliary starting liquid, progressively discharging said liquid into the air circuit under the action of said pressure, directing said air charged with the liquid in a divided state into the engine to be started and finally spraying said liquid into the intake manifold by means of the compressed air which served to carry said liquid.

The invention further provides an improved arrangement for facilitating the starting of internal combustion engines in accordance with the above disclosed method. The said arrangement comprises, in combination, an air pump or equivalent source of a pressure medium, at least one spraying nozzle adapted to be secured to the engine, a common conduit connecting the source to the spray nozzle, a container for the charge of starting-aid liquid to be sprayed into the engine, means for creating a pressure of said liquid within the container, and emulsifying means connecting said conduit with said container for gradually introducing into the conduit and mixing said liquid in a divided state with the air flowing through the conduit from the source towards the sprayer means.

As a result of the invention the pump or equivalent source of pressure air which comprises delicate and easily damaged or breakable parts such as gaskets and the like is kept out of contact with the starting aid liquid and will not be liable to deterioration thereby. The liquid container, the emulsifying means and the sprayer do not include any delicate gaskets, and so forth which are liable to be damaged by the liquid; furthermore, after termination of the liquid spraying step the whole device can be flushed clean simply by continuing the blast of compressed air for a short while after the charge of liquid has been completely sprayed; this simultaneously prevents the liquid from dwelling any length of the time in contact with the metal surfaces and positively eliminates any danger of corroding said surfaces, so that the device will operate for very long periods without showing any signs of wear.

According to a preferred embodiment of the invention the conduit connecting the source of compressed air with the sprayer may be formed with a restriction defining a first calibrated orifice which introduces a pressure drop and divides the conduit into an upstream section, the upstream section communicating with the top of the liquid container while the downstream section communicates with the bottom of said container through a second calibrated orifice disposed at such an elevation that the volume of the space defined in the container below said elevation is larger than the volume of the liquid charge, and said orifices being so calibrated that the pressure drop created by the first orifice is slightly greater than the pressure of a column of liquid corresponding in height to the distance from the outlet of the second orifice to the lowermost point of the container.

Some of the principal characteristic features of the invention, which may be applied singly or in combination, may be summarized as follows:

1. A selected liquid adapted to facilitate the starting operation is introduced in a divided state into the intake conduit of the engine.

2. The means for controlling the introduction of the liquid are grouped on the control panel or dashboard of the vehicle on which the engine is installed.

3. The liquid is circulated from a container located at or adjacent the control panel to the engine manifold by the use of a blast of air.

4. The air blast circulating the liquid simultaneously serves to divide the liquid.

5. The air is circulated by a pump operated manually as through a hand or a foot control.

6. All component parts of the pump are maintained out of contact with the liquid.

7. The starting aid liquid is circulated from the container by a venturi or suction effect which simultaneously serves to spray the liquid.

8. A spraying or atomizing device is provided at the merging of the liquid circulating conduit into the engine manifold.

9. The spraying or atomization is produced by the circulation of air charged with liquid already finely divided within a narrow annular gap.

The finely divided or "atomized" condition in which the liquid is introduced into the intake manifold imparts to the liquid a greater efficiency than in comparable devices heretofore used.

It is accordingly an object of the invention to provide an improved system whereby internal combustion engines can be started with a degree of ease and efficiency unknown heretofore. It is a related object to provide such a system whereby the components of the engine will not be subjected to any greater stresses than those sustained by them during the normal operating condition of the engine.

It is also an object to provide a system adapted not only to feed the engine during the starting period, but likewise a system adapted to ensure engine feed throughout its normal operation.

It is a further object to provide a system for producing a combustible mixture which will be liable to receive other applications than in feeding an internal combustion engine.

It is likewise an object to provide improved constructions of a pump particularly suitable for incorporation in an engine starting system of the type described.

In the ensuing description reference will be had to the accompanying drawings, wherein:

Fig. 2 is a diagrammatic illustration of the system as installed on an automotive vehicle;

Fig. 3 is a view in vertical section on an enlarged scale showing a first practical embodiment of the improved system;

Fig. 7 is a vertical section on a scale larger than Fig. 6 of the container and emulsifying device used in said modification;

Figure 1:
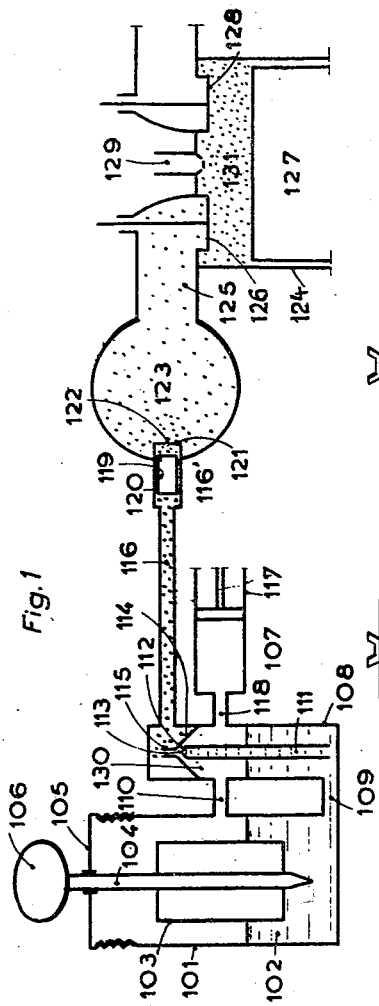
Fig. 1 is a diagrammatic illustration of a system constructed in accordance with the invention.

Reference will first be had to Fig. 1 for a general description of the invention as depicted by an illustration of its principal components. The system as shown comprises a container or tank 101 containing a body of starting-aid liquid 102. The liquid is discharged from a receptacle 103 adapted to be perforated by a punch 104 slidably supported in a cover 105 removably secured on the container 101. On actuation of the punch by means of the handle 106 the receptacle is pierced and the liquid flows into the container 101. The cover 105 is then removed, the frangible receptacle is withdrawn, and the cover 105 is put back to seal the container 101 tightly.

The container 101 communicates with a metering feeder 107 comprising a tank 108 connected with the container 101 by a duct 109. The tank 108 is further connected with the container 101 by a duct 110 extending above the liquid level. Positioned in the tank 108 is a vertical tube 111 terminating in a tapered top portion 112 formed with a small orifice 113. The taper end 112 projects adjacent to a conical wall of partition 114 formed with an outlet 115 in alignment with the tube 111, the arrangement being such that a comparatively narrow gap is present between the outlet 112 and the conical wall 114. Extending from the top of the container 108 is a conduit 116 leading to the engine. An air pump 117 communicates by a conduit 118 with the feeder 107. The conduit 116 has its downstream end connected with a jet containing a cylindrical member 119 which defines a narrow annular gap 120. Formed in the end wall 121 of said conduit is a hole 122. The conduit 116 is connected at its end with an intake conduit or manifold 123. The manifold communicates with the engine cylinder 124 by a pipe 125 in which an intake valve 126 is positioned. A piston 127 is movable in the cylinder. The exhaust valve is mounted at 128 and the fuel injection nozzle at 129 (in the case of a diesel engine or the like).

Each time the air is put under pressure within the space 130 above the liquid level in the container 101 and the capacity 108, the liquid rises in the tube 111 and tends to overflow therefrom. Moreover, air simultaneously circulates through the space 112 and exerts a venturi or suction effect whereby droplets of the liquid appearing at the outlet 113 are entrained with the air.

The mixture of air and droplets in the form of a string of beads flows through the conduit 116. The droplets are subjected to shear in the space 120 and are thus very finely divided. The fine liquid particles in an exceedingly high state of division enter the combustion chamber 131 and form therein a multiude of preferred ignition points for the fuel discharged from the injection nozzle 129, and combustion is immediately effected under excellent conditions. The introduction of starting fuel into the engine is continued as long as may be required to produce a stable idling operation of the engine.

The above described system has considerable advantages over the method currently employed for starting diesel engines, and consisting of operating the engine at full load from the initial stage of the combustion and even sometimes applying an overload to the engine, in order to maintain the rotation of the engine shaft. Such high-load operation while the engine is cold is objectionable for obvious and well recognized reasons: high stresses are set up on the connecting rod journals, liquid fluel flows along the cylinder walls, the lubricant contained in the casing is diluted, and so forth.

According to an embodiment of the invention, the container for the starting fuel may contain a dose sufficient to provide for more than one starting operation, such as two or three.

According to another embodiment, a substantially larger container is provided adapted to receive a comparatively large amount, e. g. 250 to 500 cu. cm. of starting fuel whereby a large number of starting operations will be provided for.

The air-pump used for circulating the liquid may be operated by hand or foot action, and may be of single or double acting type.

The invention further contemplates using as the movable member of the air pump, a metered container for starting liquid or fuel.

A practical construction of the system of the invention will now be described.

In the construction illustrated by way of example in Figs. 2 and 3 the internal combustion engine to be started at low temperature or under any other circumstances making the engine difficult to start, is the motor M of a motor car, and may be an ordinary explosion engine or a diesel engine. The intake manifold $a$ of the engine is provided at $b$ with the usual air inlet having a filter fitted on it. The starting device according to the invention for introducing into the intake manifold $a$ a dose V (by volume) of a starting-aid liquid or fuel, comprises an air-pump B preferably secured on the dashboard A of the car and connected by a first tubular conduit section $1a$ with the reservoir C adapted to receive the liquid 2. The reservoir has associated with it an emulsifying device D which acts to deliver compressed air from the pump B so as to discharge a mixture of the air and liquid 2 into a downstream conduit section $1b$. The section $1b$ connects with a sprayer E mounted on the intake manifold $a$.

In the illustrated construction the pump B is of the double acting type. The pump comprises a cylindrical body 190 having a piston 191 slidably mounted in it carried on a piston rod 192 which extends through the end 194 of the cylindrical body forming part of the frame, in sealing relationship with said end wall, by means of a gasket 193. The piston 191 is formed with two peripheral grooves 195 and 195' in each of which an annular gasket, 196 and 196' respectively, is arranged, adapted to seal the piston relative to the cylinder body, and the diameter of said gaskets is substantially less than the width of the grooves 195 and 195'. Opening into the groove 195 is one end 199 of a right-angled duct 200 the other end of which opens into the annular compartment 201 defined between the cylinder body 190 and the piston rod 192, while the section 199 of the duct terminates adjacent to the front face 197. A second duct 202 also having two ends at right angles provides a communication between the front compartment 200' and the groove 195, the connection of the duct with this groove being located adjacent to the front face 197.

Opening into the groove 195 adjacent to the rear face 198 is a duct 203 which at its other end opens into a bore 204 communicating with the inner space 205 in the piston rod 192, and also opening into the groove 195 near its rear wall 198 is one end 206 of a right-angled duct 207 the other end of which, at right angles to the first, opens into the compartment 200'. The space 205 communicates with the outer atmosphere. Leading from the annular gap 201 is a conduit 208 connected with the metering feeder.

The air-pump described operates as follows: with the piston 191 displaced in the direction of the arrow $f'_1$, the air from compartment 200' may enter the groove 195 through the free interval between the front face 209 of the piston 191 and the cylinder body 190. This air flows through the duct 199 into the compartment 201 and since the amount by which this compartment increases in volume is less than the amount by which the compartment 200' decreases in volume, the air is discharged under pressure through the duct 203. During this stage, the gasket 196 is held in contact with the rear face 198 of the groove, whereby the outlets of ducts 203 and 206 are sealed.

During movement of the piston in the reverse direction indicated by arrow $f'_2$, the air contained in the annular gap 201 is discharged under pressure through the duct 208. During this stage of the movement, the vacuum which tends to be created in the compartment 200 is replenished by external air entering through the bore 204, the duct 203 now uncovered, groove 196, port 206 and duct 207. In this stage of movement, the gasket 196 is applied against the front face 197 sealing the ducts 199 and 202.

In both stages of the displacement, the gasket 196 performs its function in sealing the periphery of the piston relative to the inner wall of the cylinder body.

The atmospheric air may be introduced through a port or vent formed through the wall of the hollow piston rod 192. Or, according to one desirable alternative, applicable not only to the particular construction just described, but to any other suitable pump construction, the intake of atmospheric air may be provided through a filter; such an arrangement would be particularly advantageous in a system designed for use in sand- or dust-laden atmospheric conditions. In this connection, the invention contemplates incorporating the filter into the handle or knob provided for actuating the piston rod. As shown in the drawing, the knob 211 may then be formed in two parts 212 and 213 removably connected to each other in any suitable way, e. g. through a threaded ring 214. Clamped between a shoulder 215 of this ring and an abutting face 216 of the part 212 as frame 217 across which one (or more) air filtering elements 218 are disposed. The air is let into the space 219 within the handle 211 through a number of perforations 220 formed in the part 213 of the knob.

Reference is now made to Figs. 2 and 3 showing an embodiment of the invention. The reservoir C adapted to receive the metered dose 2 of liquid, is formed in the metal body 21 secured by screws 22 to the dashboard A. The reservoir C essentially comprises a capacity 23 into which the liquid may be placed on removal of the cover 24 threadedly or otherwise secured to the body of the capacity with an interposed gasket 25.

The bottom of the capacity 23 has a central outlet 26 opening into a cylindrical cavity 27 in which a filter 28 is housed which is retained by the head of a screw 29 threaded into a tapped portion 30 of the body 21. The liquid 2 in the capacity 23 is able to flow through filter 28, radial ducts 31 and an axial duct 32 formed in screw 29, and a hole 32a forming an extension of the tapped bore 30, into a well 33 formed vertically in the end block 21. The well 33 has its upper end connected through a calibrated orifice 34 serving as a jet nozzle, with the downstream section 1b of the conduit 1a—1b connecting the pump B with the sprayer E. The level H—H at which the calibrated orifice 34 opens into the downstream conduit section 1b is so predetermined that when the metered dose of liquid 2 corresponding to a predetermined volume V is poured into the capacity 23, the liquid level is established as a result of hydrostatic balance between the enclosure 23 and in the well 33, at a level $h$—$h$ slightly lower than the level H—H. The liquid is therefore unable to flow out in the absence of a pressure sufficient to raise it up to the elevation of the conduit leading to the sprayer.

The upstream section 1a of the conduit connects at 35 directly into the upper part of the capacity 23 and both the upstream and downstream sections 1a and 1b communicate with each other within the block 21 by means of an orifice 36 so calibrated as to create a pressure drop slightly greater than $d \times L$, wherein d is the density of the liquid 2 and L the distance from the outlet of calibrated orifice 34 in section 1b to the lowermost point of the reservoir C that can be attained by the liquid. The device operates in the following way:

In order to start the engine M, the driver first introduces the metered dose V of liquid 2 into the capacity 23 of reservoir 23. Then the handle 12 of pump B is actuated back and forth a few times in order to discharge air through the conduit section 1a. This air enters block 21 and there divides into two portions one of which passes at 35 and fills the capacity 23 above the liquid 2, while the other passes through the calibrated orifice 36 and enters the downstream conduit section 1b.

The pressure drop created by orifice 36 allows the liquid which fills the well 33 in a static condition up to the level $h$—$h$, to rise in the well and the liquid oozes, squirts or spouts forth from orifice 34 into the downstream conduit section 1b, until the dose is completely exhausted, provided only the air blast lasts a sufficient period of time, which incidentally does not exceed a few seconds. The liquid droplets in a more or less finely divided state which are thus delivered into conduit section 1b are there propelled downstream, i. e. towards sprayer E, in a form resembling a string of beads, by the air delivered through the calibrated jet 36.

It has been found that after these droplets have passed through the sprayer there is obtained in the manifold a an extremely fine spray of "atomized" starting liquid.

As soon as a certain amount of spray has been thus produced and before the spraying operation is completed, the driver then feeds the engine starter in the usual manner, and, during the starting period, the pump is kept in operation.

Experience shows that owing to the extremely high degree of pulverization produced with the arrangement described, the engine will start within a remarkably short time even in bitter cold, at surrounding temperatures below —30 degrees centigrade.

As already mentioned and as clearly apparent from the drawings and description, the pump B is kept entirely clear of any contact with the liquid. Hence, all seals and gaskets made of rubber or similar substance comprised in the pump are kept free of damage from the corrosive character of the liquid.

Another embodiment of the invention will now be described with reference to Figs. 8 to 11, illustrating a modified construction for the pump usable in a system according to the invention. In this modification, the pump comprises a first or inner cylinder body 150 mounted inside a second or outer cylinder body 151. Both bodies are secured on a frame 152. Mounted in the body 150 for reciprocating sliding motion is a piston 153. The piston comprises a body 154 having its lateral surface formed with three grooves 155, 156, 157 substantially semi-cylindrical in cross section. While the middle groove 156 is empty, each of the other two grooves 155 and 157 receives a ring 158 and 159 respectively, made of rubber or similar material. The rings are such in diameter and cross section that, whilst they provide for a tight seal between piston 154 and cylinder body 150, yet they are free to assume some axial displacement with respect to the piston body 154, so that they control the outlets of ducts 160 and 161 respectively connected with the grooves. The duct 160 has one end opening into the groove 155 and its other end into the compartment 162 in front of the piston 153. The duct 161 similarly has one end connecting with the groove 157 and its other end with the compartment 163 at the rear of the piston 153. The piston is supported on a rod 164 which extends through the frame 152 in a bore 165 therein, and is provided on its free end with an actuating knob or handle 166. Connecting with the groove 156 is a duct 167 formed axially through the rod 164 and communicating with a transverse port 168 formed through the wall 169 of the tubular piston rod and communicating at all times with the outer atmosphere. The body 150 has its rear end sealed by an end plate or cover 170 provided with a valve 171 consisting of a ball 172 cooperating with an aperture 173 formed in said end plate, so as to control a duct 174 opening into the rear compartment 175 of the cylinder 151. The ball 172 is urged into application against its seat 177 by a spring 176. The cylinder body 151 at its rear end is sealed by a solid end plate 178. Opening into the annular space 179 defined between the cylinder body 150 and the cylinder body 151 towards the rear end thereof is a duct 180 formed through the frame 152 and having its other end opening into the feeder 107. The compartment 163 has a duct 181 opening into it, the other end of this duct opening into a bore 182 formed in the frame 152. Opening into this bore is a duct 183 leading from the feeder 107. The connection between duct 181 and bore 182 is arranged with a conical valve seat 184 having a cooperating ball 184 urged against the seat by a spring 186 abutted against a plug 187 which seals the bore 182.

Figure 4:
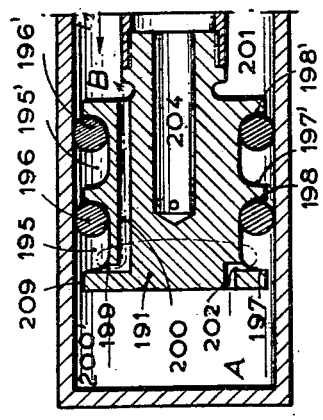
Fig. 4 shows part of the pump on a yet greater scale.
Figure 5:
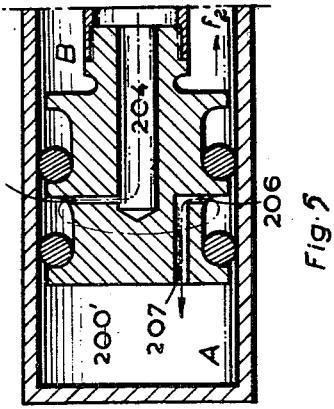
Fig. 5 is a view similar to Fig. 4 in a different condition.

The pump just described operates as follows: On actuation of the knob or handle the piston 153 is displaced e. g. in the direction indicated by the arrow $f$; the rings 158 and 159 which are in frictional engagement with the surface of body 150 assume the positions indicated in Fig. 4, i. e., the annular seal 158 uncovers the connecting orifice of groove 155 with duct 160, while annular seal 159 seals the orifice connecting duct 161 with groove 157. The air compressed within annular space 163 owing to the forward displacement of the piston 153 is discharged into the metering feeder 107 through duct 181, since the ball 185 is now unseated by the air pressure in duct 183. The vacuum which tends to be created in chamber 162 is filled by air delivered through the axial duct 167 of piston rod 169, the intermediate groove 156, and the duct 160 now uncovered. During this movement the ball 172 remains applied on its seat.

Figure 11:
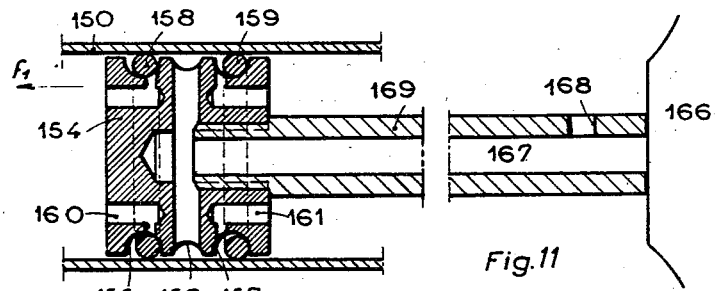
Fig. 11 is similar to Fig. 10 but drawn for another condition.
Figure 8:
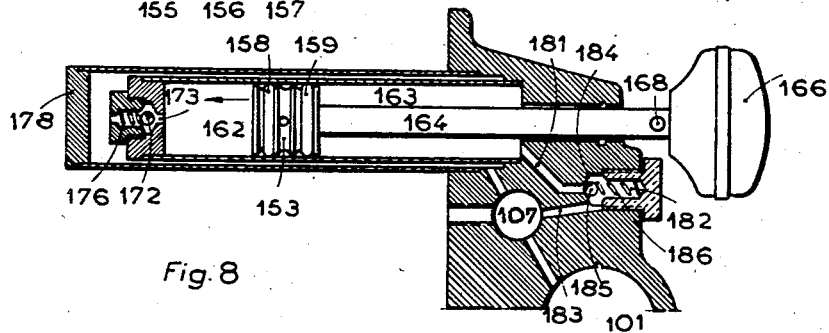
Fig. 8 is a section of a modified pump construction.

During the opposite displacement of piston 153 as indicated by the arrow $f_1$ (Fig. 11), the annular seals 158 and 159 assume the positions shown in said figure, wherein the opening of duct 160 into groove 155 is sealed whereas the opening of duct 161 into groove 157 is uncovered. The air from compartment 163 expelled by piston 153 unseats the ball, flows through duct 174 and then through annular space 179 and duct 180 into the feeder 107. The pressure thus built up in duct 183 applies the ball 185 against its seat 184, so that the compressed air exerts an effective action on the liquid contained in the feeder. During this movement, the suction which tends to be created in the annular compartment 163 is continually replenished by the intake of fresh air from the surrounding atmosphere through port 168 of duct 167 which opens into groove 156 then through duct 161 the opening of which is now uncovered by seal ring 159 as explained above.

Thus it is seen that in either sense of displacement of piston 153, pressure air is delivered into feeder 107 to produce the effects described.

An air pump of the rotary type may be used, and may be driven if desired by the conventional starting motor associated with the engine M.

Figure 6:
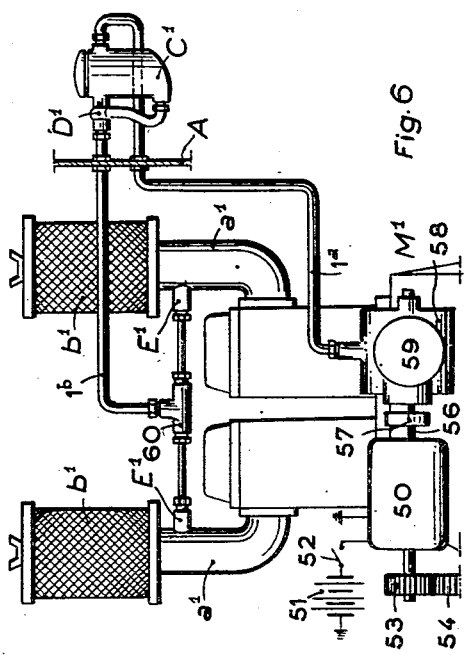
Fig. 6 is a diagrammatic showing of a modification.
Figure 9:
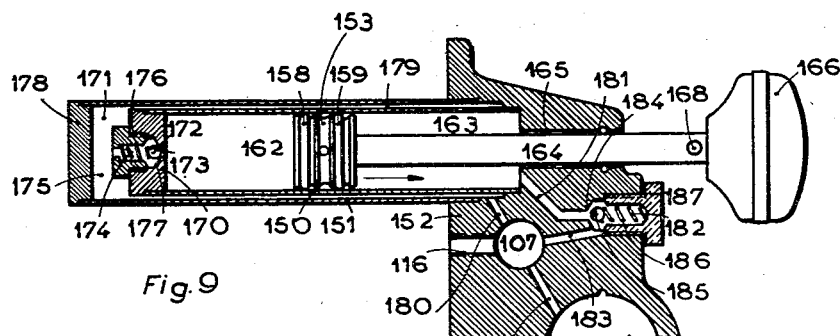
Fig. 9 is a view similar to Fig. 8 in a different condition.
Figure 10:
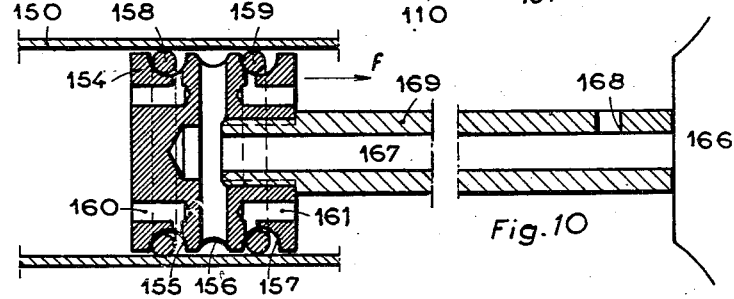
Fig. 10 is a sectional view on an enlarged scale showing part of said pump.

Figs. 6 and 7 illustrate a further embodiment of the invention. In this construction there is shown a conventional starting motor 50 for the engine $M_1$. The starting motor is supplied with power from a storage battery 51 on actuation of the starting switch 52. The usual axially slidable pinion 53 is provided adapted to be moved into and out of mesh with the annular gear 54 secured to the shaft 55 of the engine $M_1$. The starter shaft 56 is moreover coupled as at 57 with the rotor of a rotary pump 58 of any suitable conventional type, vaned or otherwise designed, which draws in air from the atmosphere through a filter 59 into the upstream conduit section $1a$, through which the air circulates. This section connects directly at its other end with the upper portion of the capacity $23a$ of the reservoir $C_1$. The downstream conduit section $1b$ leads from this capacity and is formed at $36a$ with the calibrated orifice serving to introduce the requisite pressure drop as previously described. Opening into the downstream conduit section beyond this orifice $36a$ is a further calibrated port $34a$ which communicates through a pipe $33a$ with the base of capacity $23a$.

The downstream end of the conduit section $1b$ has a T-shaped connector 60 fitted to it for supplying in parallel two sprayers $E_1$ each connected to a manifold $a_1$ provided with a filter $b_1$ catering to one cylinder or a group of cylinders of the engine.

Generally speaking the arrangement just described operates in the same way as that previously described. For starting the engine, the driver will simply have to close the switch 52 thereby setting the starting motor running. This simultaneously drives the engine $M_1$ and the pump 58 which sets up a circulation of air under pressure serving to convey the liquid 2 from the reservoir $C_1$ to the sprayers $E_1$ whence the sprayed liquid is delivered into the intake manifolds $a_1$.

In this form of the invention the delivery of the starting liquid is made synchronous with the starting of the engine.

The invention may be applied with equal effect to apparatus for delivering air charged with a fluid other than that specifically mentioned above, as for facilitating the starting of jet engines.

Furthermore, the invention is likewise applicable to the normal supply of liquid fuel to an internal combustion engine, or again to a burner, quite apart from the supply of an auxiliary fuel or starting aid liquid as heretofore described.

In this connection it may be stated that the invention is chiefly directed to a method of supplying fuel for combustion in an engine, wherein the fuel is first divided into droplets by a venturi suction effect, which droplets are driven by air in a form resembling a chain or string of beads, and the fuel in this preliminarily divided form is then subjected to a vaporizing-atomizing step, the resulting vaporized spray mixture providing the combustible charge for the engine.

The invention is likewise directed to a burner which includes a fuel supply device comprising means for delivering liquid fuel in the form of fine droplets with pressure air, which air desirably may have participated in the formation of said droplets by a venturi effect, and means for vaporizing said droplets, the resulting vapor providing the combustible mix for the burner.

By applying the invention it becomes possible to construct liquid fuel burners having any selected heating capacity, including very low-power burners which will be free of the short-comings heretofore inherent thereto, such as unwanted interruptions in operation, coking, requirement for an induced draft system, and the like.

What is claimed is:

1. Apparatus for facilitating the starting of an internal combustion engine having a fuel tank and fuel supply means, which comprises a reservoir separate from the fuel tank for a starting-aid liquid different from the fuel in the tank, an air-pump connected with said reservoir venturi means operatively associated with said pump so that the air delivered by the pump will carry with it liquid from the reservoir, conduit means separate from the fuel supply means connecting the reservoir with said engine, and vaporizing means for said liquid in the connection of said conduit with said engine.

2. Apparatus as claimed in claim 1, wherein the air pump comprises a pump body, a piston defining two compartments in said body, a peripheral annular groove in the piston, a seal ring in said groove having the shape of a torus, the cross sectional diameter of said ring being substantially smaller than the width of the groove, a first duct connecting said groove with one compartment of said pump and a second duct connecting the groove with said other compartment, both ducts opening into said groove adjacent a common end thereof.

3. Apparatus as claimed in claim 2, wherein the piston comprises a further cylindrical annular groove and a further torus-shaped seal ring in said further groove.

4. Apparatus as claimed in claim 1, wherein the air pump comprises a pump body, a piston defining a pair of compartments in said body, three axially spaced annular peripheral grooves in said piston including a center groove and two end grooves, a torus-shaped seal ring in each end groove, the cross sectional diameter of each ring being smaller than the width of the related end groove, a duct connecting an end groove with one of said compartments and a second duct connecting the other end groove with the other compartment, and a third duct connecting the intermediate groove with the outer atmosphere.

5. Apparatus as claimed in claim 1, wherein the air-pump comprises an actuating handle, air intake means in said handle for admitting atmospheric air into the pump, and means in said handle for filtering said air.

6. Apparatus for supplying liquid fuel to a burner, comprising a reservoir for said fuel, an air pump connected with the reservoir, means for conveying said liquid fuel with air delivered by said air pump and delivering it to the burner, and means for finely dividing the liquid carried by the air from the pump as it enters the burner.

7. Apparatus for supplying starting fluid to an internal combustion engine having operating fuel supply means comprising a supply conduit terminating at the engine, means to cause air to circulate in the supply conduit in a direction toward the engine, a tank for the starting fluid separate from the operating fuel supply means, and means for conveying the starting fluid from the tank in response to air circulation in the conduit.

8. Apparatus according to claim 7, wherein the means to cause air to circulate comprise a pump.

9. Apparatus according to claim 8, wherein the pump is a double-acting pump.

10. Apparatus for supplying starting fluid to the internal combustion engine of an automotive vehicle having a starter and operating fuel supply means comprising a supply conduit for the engine, an air pump to cause air to circulate in the conduit, means for driving the pump from the engine starter, a tank for the starting fluid separate from the operating fuel supply means, and means for conveying the starting fluid from the tank in response to air circulation in the conduit.

11. Apparatus according to claim 7, wherein the means for conveying the starting fluid comprise an air venturi.

12. Apparatus according to claim 7, wherein the supply conduit opens into the intake manifold of the engine.

13. Apparatus according to claim 12, further comprising means adjacent the connection of the supply conduit to the intake manifold for vaporizing the starting fluid.

14. Apparatus according to claim 7, wherein the conveying means and the tank comprise a unitary structure.

15. Apparatus for supplying starting fluid to an internal combustion engine having operating fuel supply means comprising a supply conduit terminating at the engine, an air pump connected to the conduit to cause air to circulate therein, a tank for the starting fluid separate from the operating fuel supply means and including fluid-tight closure means, and venturi means as between the tank and conduit, the conduit comprising downstream of the pump a first branch terminating at the venturi means and a second branch terminating at the upper part of the tank.

16. Apparatus for supplying starting fluid to the internal combustion engine of an automotive vehicle having operating fuel supply means comprising a supply conduit for the engine, an air pump connected to the conduit to cause air to circulate in the conduit toward the engine, air filtering means included in the pump, a tank for the starting fluid separate from the operating fuel supply means, and means for conveying the starting fluid from the tank in response to air circulation in the conduit.

17. Apparatus according to claim 16, wherein the pump comprises an actuating handle having the filtering means accommodated therein.

18. Apparatus for supplying starting fluid to an internal combustion engine having an intake manifold comprising a main tank having a starting fluid receptacle therein, means supported by the main tank for penetrating into the receptacle and causing fluid contained therein to flow into the main tank, a second tank, first and second conduits communicating between the main and second tanks respectively at their lowest levels and at a level above that of the starting fluid in the main tank, an air pump comprising a discharge pipe opening into the second tank above the level of the starting fluid, a tube extending downwardly into the second tank and having an open lower end and a restricted upper end positioned above the level of the starting fluid in the tanks, a wall partitioning the second tank and having an opening therein surrounding the upper end of the tube, and a conduit communicating between the second tank above the partitioning wall and the intake manifold of the engine.

References Cited in the file of this patent

UNITED STATES PATENTS

| | | |
|---|---|---|
| 1,151,150 | Allison et al. | Aug. 24, 1915 |
| 1,155,205 | Brauer | Sept. 28, 1915 |
| 1,162,803 | Parkes | Dec. 7, 1915 |
| 1,187,977 | Demers | June 20, 1916 |
| 2,175,743 | Coffman | Oct. 10, 1939 |
| 2,590,445 | Moody | Mar. 25, 1952 |
| 2,601,211 | Neely | June 17, 1952 |
| 2,681,053 | Moody | June 15, 1954 |